United States Patent [19]

Lässig

[11] 4,022,334
[45] May 10, 1977

[54] APPARATUS FOR STACKING SACKS ONTO PALLETS

[75] Inventor: Harry Lässig, Hamburg-Schenefeld, Germany

[73] Assignee: Firma Fordertechnik Hamburg Harry Lassig, Hamburg-Schenefeld, Germany

[22] Filed: June 26, 1975

[21] Appl. No.: 590,633

[52] U.S. Cl. .............................. 214/6 P; 214/6 DK
[51] Int. Cl.² ........................................ B65G 57/24
[58] Field of Search ................ 214/6 P, 6 DK, 6 H; 100/192

[56] References Cited

UNITED STATES PATENTS

| | | | |
|---|---|---|---|
| 437,524 | 9/1890 | Smith | 100/192 X |
| 3,164,080 | 1/1965 | Miller | 214/6 P X |
| 3,429,459 | 2/1969 | Paul et al. | 214/6 P X |
| 3,567,046 | 3/1971 | Reist | 214/6 DK |
| 3,651,962 | 3/1972 | Arnemann | 214/6 DK |
| 3,667,628 | 6/1972 | Gabler et al. | 214/6 DK |
| 3,698,572 | 10/1972 | Dahlem et al. | 214/6 DK |
| 3,700,127 | 10/1972 | Kurk et al. | 214/6 P X |
| 3,756,427 | 9/1973 | Arnemann | 214/6 DK |

*Primary Examiner*—L. J. Paperner
*Attorney, Agent, or Firm*—Toren, McGeady and Stanger

[57] ABSTRACT

An apparatus for automatically stacking sacks onto pallets, comprising several conveyor means, sack positioning and flattening devices, sack transfer devices, sack layer assembling devices, a packing plate assembly, an elevator platform, and actuating and control means wherein sacks supplied to the apparatus in a substantially continuous feed stream are flattened and assembled into sack rows, several sack rows are assembled into a sack layer, and several sack layers are successively stacked on a pallet. Empty pallets are automatically supplied to the elevator platform from a pallet magazine. The elevator platform cooperates with the packing plate assembly for transferring the sack layers onto the pallet. Fully loaded pallets are discharged automatically at the output side of the apparatus.

3 Claims, 3 Drawing Figures

APPARATUS FOR STACKING SACKS ONTO PALLETS

The present invention relates to an apparatus for stacking sacks onto pallets wherein the sacks are transported along a conveyor and transferred onto a packing plate by means of a transfer bar which is movable perpendicularly to the feed direction of the sacks on the conveyor. The packing plate serves as a transfer means from which the sacks are subsequently transferred onto a pallet which is placed on an elevator platform adapted to be raised or lowered. After setting down a layer of sacks onto the pallet or onto one layer or several layers of sacks already set down on the pallet, the elevator platform is lowered and subsequently again moved upwardly towards the packing plate. The packing plate has a substantially plane upper surface and a curved lower surface. The lower packing plate surface is arcuately shaped in defining a convex curvature of an increasing depth from two opposite edges towards a center line of the packing plate. Retaining bar means is disposed adjacent the upper surface of the packing plate in the vicinity of an outer stacking edge of the sacks and at a side of the packing plate which side is facing away from the direction of movement of the packing plate. The retaining bar means is adapted to be urged against a topmost layer of sacks when the packing plate is being withdrawn.

Sack loading apparatus of this type are known by e.g. the U.S. Pat. Nos. 3,651,962 and 3,756,427, both of the same applicant. In the heretofore known automatic apparatus for the "palletizing" of sacks, i.e. the stacking of a plurality of sacks in well-defined sack layers onto pallets, the sacks are rotated into certain positions in dependence upon the sizes and shapes of the sacks, to form sack layers which are subsequently transferred onto the pallets.

A drawback of prior art apparatus of this type is, however, that the sack feed is dependent upon the transfer capacity of the packing plate. Because of the restricted transfer rate of the packing plate, the sacks may be supplied to the apparatus only intermittently, i.e. on a stop-and-go basis, in thus severely restricting the overall loading capacity of the apparatus.

It is a principal object of the present invention to provide novel and improved apparatus for stacking sacks onto pallets of a substantially increased sack stacking capacity wherein sacks may be handled in a continuous flow.

In accordance with the present invention there is now proposed an apparatus for stacking sacks onto pallets including conveyor means for feeding sacks to the apparatus, transfer means, a packing plate and an elevator platform wherein the sacks are transferred onto the packing plate by means of a conveyor assembly and a transfer bar movable perpendicularly to the feed direction of the sacks, the packing plate is arranged in a position laterally spaced from the upstream end of the conveyor means and defines transfer means for transferring sacks disposed on the packing plate onto a pallet which is placed on the elevator platform, the elevator platform is adapted to be selectively raised or lowered whereby after setting down a layer of sacks onto the pallet or onto one layer or several layers of sacks already stacked on the pallet the elevator platform is lowered and subsequently again moved upwardly toward the packing plate.

This apparatus furthermore includes the combination of the following sub-assemblies:

a. A sack shaping station including a sack jolting and flattening assembly in which the contents of the sacks are evenly distributed throughout the confines of the sack, and a surfacing plate for trimming the upper surface of the sacks into a smooth substantially plane shape while the sacks are being moved along a conveyor, the surfacing plate being automatically adjustable in height to the thickness of a sack, in exerting a substantially constant flattening pressure;

b. a sack distribution station including a variable speed conveyor and a sack rotating assembly;

c. a sack row-forming roller track including a stop ledge adjacent the upstream end of the roller track looking in the sack feeding direction, and sack row transferer means movable transversely of the longitudinal feed direction of the sack row-forming roller track, the sack row transferer means adapted to perform an active transfer movement and a passive return movement during which the transferer means is displaced upwardly;

d. a sack row magazine disposed intermediate the sack row-forming roller track and the packing plate assembly, the sack row magazine adapted to receive rows of sacks being transferred thereto from the sack row forming roller track and to be moved into a position substantially overlying the packing plate assembly;

e. a two-part packing plate assembly having upper and lower surfaces, the lower surfaces being arcuately shaped in defining downwardly bulging portions of an incresing depth from two opposite lateral edges towards a center line of the packing plate assembly, and associated guide bars adjacent mutually opposed lateral edges of the packing plate assembly, and a sack stripping or transfer member disposed above the packing plate assembly and adapted to be lowered towards the packing plate assembly when the sack row magazine is being moved from a position substantially overlying the packing plate into a position intermediate the packing plate assembly and the sack row forming roller track;

f. an elevator platform adapted to receive a pallet; and g. a roller track for removing loaded pallets from the apparatus.

In accordance with a modified embodiment of this apparatus the sack row magazine includes a stationary plate and a transfer assembly with a sack transfer member movable between a position substantially overlying the stationary plate and a position substantially overlying the packing plate, the sack transfer member adapted to be lowered into a lower active position when moving from the stationary plate towards the packing plate assembly, and to be raised into an upper inactive position when moving from the packing plate assembly into a position substantially overlying the stationary plate of the sack row magazine.

In the following an illustrative embodiment of the apparatus of the present invention will be described with reference to the appended drawings wherein FIG. 1 is a schematical perspective view of an apparatus for stacking sacks onto pallets in accordance with the present invention;

Figure 1:
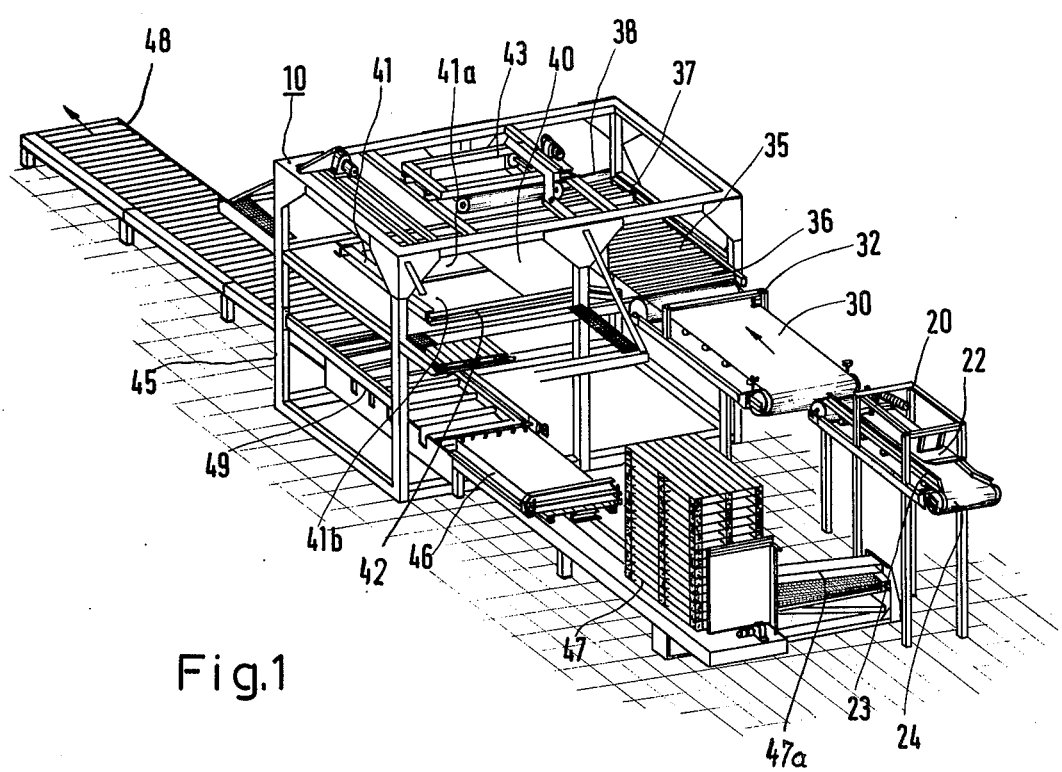

Referring to FIG. 1, the apparatus for stacking sacks onto pallets comprises a frame structure generally indicated by the reference numeral 10 in which are mounted a sack shaping station 20, a sack distribution station 30, a sack row-forming roller track 35, a sack row magazine 40, a packing plate assembly 41, an elevator platform 45, a supply station 47 for empty pallets and a discharge end roller conveyor 48.

Figure 2:
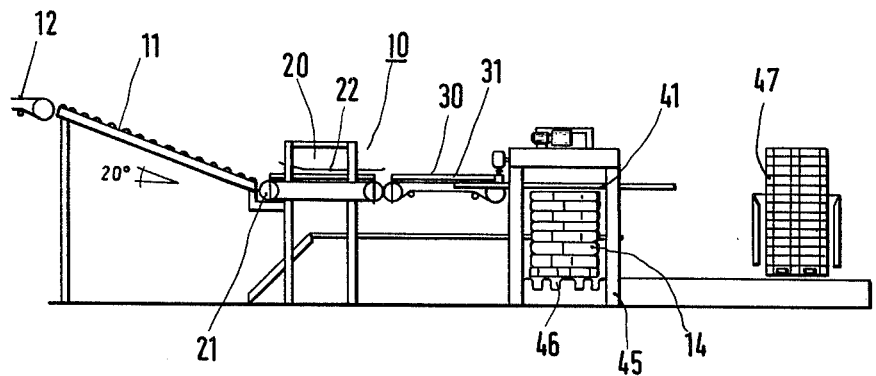
FIG. 2 is a lateral elevational view of the apparatus shown in FIG. 1.
Figure 3:
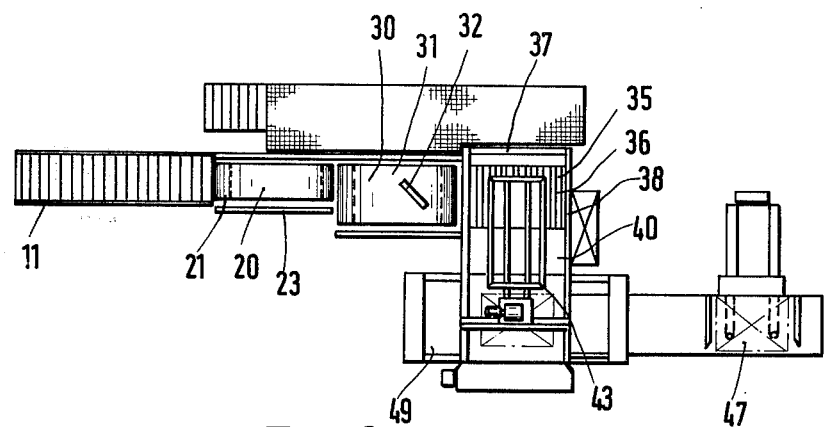
FIG. 3 is a top view of the apparatus shown in FIG. 1.

A feed conveyor 12 (FIG. 2) feeds sacks 14 along an inclined roller track 11 to the sack shaping station 20 (FIGS. 2 and 3). The sack shaping station 20 includes a jolting and flattening assembly 21 with a continuous conveyor 24. A pair of mutually spaced guide bars 23 is mounted above and laterally of the continuous conveyor 24. The spacing of the guide bars 23 slightly exceeds the width of a sack 14, and this spacing is adjustable. The jolting and flattening assembly 21 serves to evenly distribute the contents of a sack 14 within the confines of the sack while the sack is being transported along the continuous conveyor 24. During this sack smoothing action, the contents of the sack will not be compressed. The jolting and flattening assembly 21 includes a top surfacing plate 22 which may consist of a plastic coated plate that is mounted at the lower end of a parallelogram type linkage. The surfacing plate 22 serves to trim the upper surface of the sacks 14 into a smooth substantially plane shape. The surfacing plate 22 adjusts itself automatically in height in dependence upon the thickness of a sack in thus exerting a substantially constant flattening pressure to the upper surface of the sacks. The weight of the surfacing plate 22 may be varied continuously such as by springs or a counterbalance.

A sack distribution station 30 is arranged at the upstream end of the jolting and flattening assembly 21. The sack distribution station 30 includes a variable speed conveyor 31 and a sack rotating assembly 32. The sack rotating assembly 32 is disposed above the conveyor 31 and includes a pivot mounted plate-shaped rotating member by which the sacks 14 may be rotated as required for compound stacking. After having been rotated into a predetermined position, the sacks are transferred from the sack distribution station 30 onto a sack row-forming roller track 35 disposed at the upstream end of the conveyor 31. Along the sack row-forming roller track 35, sacks 14 are continuously transported by rollers 36 to a stop ledge 38 which is disposed adjacent the upstream end of the roller track 35. A sack row transferer 37 is arranged relative to the stop ledge 38 and the rollers 36 to enable movement of a row of sacks accumulated at the stop ledge 38 in a direction transversely of the direction of feed of the roller track 35. Thus by means of the sack row transferer 37 each row of sacks assembled at the upstream end of the sack row forming roller track 35 may be transferred, transversely of the feed direction of the roller track 35, onto a sack row magazine 40. The sack row magazine 40 includes a carrier platform adapted to be moved into a position substantially overlying a packing plate assembly 41 which is disposed on the opposite side from the roller track 35. A sack stripping or transfer member 43 is arranged above the packing plate assembly 41 and the sack row magazine 40 in a position substantially midway between the packing plate assembly and the magazine. When the carrier platform of the sack row magazine 40 is being moved into a position substantially overlying the packing plate assembly 41, the sack stripping member 43 is in a upward inactive position. Before withdrawal of the carrier platform from the packing plate assembly 41, the sack stripping member 43 is lowered into an active position so that during the return movement of the carrier platform towards the roller track 35 a sack row lying on the sack row magazine 40 will be transferred onto the packing plate assembly 41. Thus, it will be seen that by lowering te sack stripping member 43 to the proper elevation relative to the carrier platform of the sack row magazing 40, the movement of magazine 40 toward the roller track 35 while the stripping member 43 is held stationary over the magazine 40, will cause the sack row to be stripped therefrom. In a modified embodiment, the carrier platform of the sack row magazine 40 may consist of a stationary plate. In this case, the sack stripping member 43 which may be raised or lowered is replaced by a sack transfer assembly 43 with a sack transfer member movable between a position substantially overlying the stationary plate and a position substantially overlying the packing plate assembly and adapted to be lowered into a lower active position when moving from the stationary plate towards the packing plate assembly, and to be raised into an upper inactive position when moving from the packing plate assembly 41 into a position substantially overlying the stationary plate of the sack row magazine 40.

The packing plate assembly 41 includes two packing plate halves 41a and 41b (FIG. 1). The two packing plate members 41a and 41b may be moved towards and away from each other along lateral guides (not shown). By successively transferring several sack rows onto the packing plate assembly 41, a complete sack layer is assembled thereon. The four lateral outer sides of every sack layer assembled on the packing plate assembly are urged into predetermined positions by e.g. plastic coated guide bars 42 arranged above the packing plate assembly. The guide bars 42 thus serve to define straight line stacking contours so that empty spaces between sacks will only appear in the interior of a stack. By moving apart in a lateral direction the packing plate halves 41a and 41b, through hydraulically or pneumatically operated piston cylinder assemblies (not shown) the sack layer arranged on the packing plate assembly 41 will be set down on a underlying empty pallet 46 or onto a sack layer that has previously been set down onto the pallet. In setting down the sack layer onto the pallet or onto a previous sack layer the vertical distance through which the sacks "drop" is on the order of a few inches so that the sacks will not be deformed during this setting down operation. During setting down of a sack layer the guide bars 42 guide the four lateral outer sides of the layer so that no sack 14 of the sack layer may escape outwardly. Before setting down a sack layer from the packing plate assembly 41, the elevator platform 45 with an empty pallet 46 or a layer of sacks that has previously been deposited onto the pallet 46 is lefted upwardly towards the packing plate assembly 41 into a position in which a small clearance is left between the lower surface of the packing plate assembly and the upper surface of the pallet or the sack layer respectively. After setting down a sack layer the elevator platform 45 with the pallet 46 and one or several layers of sacks already set down thereon are lowered by a distance corresponding approximately to the thickness of one and a half sacks so as to clear the packing plate assembly 41 when the latter is returned into the closed sack receiving position. For obtaining a tight stacking, the elevator platform 45 again moves upwardly and urges the one or several layers of sacks stacked on the pallet 46 against the lower surface of the packing plate assembly 41 which has been returned into the closed position. The sack layers will be held under pressure in this manner until shortly before again moving apart the packing plate halves 41a, 41b. Immediately before moving apart the packing plate halves 41a and 41b the elevator platform 45 with the pallet 46 and the one or several sack layers stacked thereon is lowered through a small distance of a few inches. Upon opening of the packing plate assembly 41, i.e. moving the members 41a, 41b apart, a sack layer which has in the meantime been assembled from sack rows transferred from the sack row magazone 40 will be set down onto the pallet 46 or the previous sack layer in the above described manner.

When a desired sack stacking height on the pallet 46 has been reached (FIG. 2), the elevator platform 45 sets down the pallet 46 with the stacked sacks thereon onto a bottom roller track 49. This bottom roller track 49 is then activated to transport the fully loaded pallet towards a roller track 48 for fully loaded pallets. The roller track 48 is disposed at the upstream end of the roller track 49. Concurrently with this operation, an empty pallet 46 is automatically suplied from a supply station 47 for empty pallets to the elevator platform 45.

The elevator platform 45 moves the empty pallet 46 upwardly into a initial topmost position in which the pallet is slightly spaced from the lower surface of the packing plate assembly 41. In the meantime another sack layer has been assembled on the packing plate assembly 41. The next following setting down operation is immediately initiated.

The supply station 47 for empty pallets preferably consists of a fork type magazine which allows to handle pallets of different sizes, shapes and heights. A magazine of this type is insensitive to damaged or warped pallets 46. The supply of empty pallets 46 is fully automatic by means of a motor-driven transfer device 47a.

The roller track 48 for fully loaded pallets may either consist of a non-driven horizontal roller track or an inclined roller track. When it is desired to store relatively large quantities of empty pallets, preferably may be employed a horizontal pallet storage magazine roller track for feeding individual pallets or a mechanically actuated feed mechanism.

The loading apparatus of the present invention may likewise be operated in combination with a cardboard pallet magazine. The cardboard pallets may be introduced into the storage magazine manually or by means of a fork lift truck. A lifting device with suction nozzles may be employed for feeding the empty cardboard pallets into the machine. The suction force may be adjusted by compressed air through the so-called injector effect. When employing cardboard pallets, the longitudinal spacing between the rollers of the roller track for fully loaded pallets must be reduced.

The various conveyors and roller tracks such as the feed conveyor 12, the jolting and flattening assembly 21 with the continuous conveyor 24, the conveyor 31 of the sack distribution station 30, one or several rollers 36 of the sack row-forming roller track 35 and one or several rollers of the bottom roller track 49 are of course driven at variable speeds by e.g. electric drive motors (not shown), optionally through reduction gearing. The various sack layer assembling means such as the sack rotating assembly 32, the sack row transferer 37, the sack stripping member 43, the packing plate assembly 41 and the elevator platform 45 are actuated by conventional hydraulically or pneumatically operated piston cylinder assemblies likewise not shown. The inclined roller track 11 may consist of idling rollers and include a angle of about 20° with the horizontal so that the sack feed is effected by gravity. All drive and actuating means are controlled by a suitable program. The controls are combined in the usual manner in a control cabinet (not shown).

The apparatus of the present invention is very versatile and may be used for a widely differing range of applications. The control cabinet (not shown) in which the various controllers are combined may be installed remote from the apparatus or in another room so that no operating personnel would normally be required in the vicinity of the apparatus. The controls may include layer selector switches for predetermining a desired number of stacking layers. The apparatus may also be operated according to several different sack stacking programs.

The various guide bars may either be manually adjusted within continuous adjustment ranges in accordance with a desired stacking pattern, or the adjustment of the guide bars mau be controlled pneumatically in several increments in dependence upon the stacking program by means of corresponding electrical controllers adapting the positions of the guide bars to various sizes of sacks and pallets.

The stacking apparatus of the present invention achieves a high sack stacking capacity. Since the speeds of the feed conveyors may be adjusted, the sack flow may proceed without any interruptions. The two-part packing plate assembly 41 allows to reduce by substantially half the opening and closing periods when setting down a sack layer. During the setting down operation of a sack layer another sack layer may already be assembled on the sack row magazine 40 so that after setting down a sack layer onto the pallet and closing of the packing plate assembly 41 another sack row may immediately be transferred onto the packing plate assembly. The speeds of the various transfer means are variable in thus allowing to adjust the same so as to provide for an extremely careful handling of the sacks. Damages to the sacks or the contents thereof are therefore positively avoided.

The embodiments of the invention in which an exclusive property or privilege is claimed are defined as follows:

1. An apparatus for stacking sacks onto pallets, including conveyor means for feeding sacks to the apparatus, transfer means, a packing plate and an elevator platform wherein the sacks are transferred onto the packing plate by means of a conveyor assembly and a transfer bar movable perpendicularly to the feed direction of the sacks, the packing plate is arranged in a position laterally spaced from the upstream end of the conveyor means and defines transfer means for transferring sack disposed on the packing plate onto a pallet which is palced on the elevator platform, the elevator platform is adapted to be selectively raised or lowered whereby after setting down a layer of sacks onto the pallet or onto one layer or several layers of sacks already stacked on the pallet the elevator platform is lowered and subsequently again moved upwardly toward the packing palte, said apparatus cahracterized by the combination of:

a. a sack shaping station including a sack jolting and flattening assembly in which the contents of the sacks are evenly distributed throughout the confines of the sack, and a surfacing palte for trimming the upper surface of the sacks into a smooth substantially plane shape while the sacks are being moved along a conveyor, the surfacing plate being automatically adjustable in height to the thickness of a sack, in exerting a substantailly constant flattening pressure;

b. a sack distribution station including a variable speed conveyor and a sack rotating assembly;

c. a sack row-forming roller track including a stop ledge adjacent the upstream end of the roller track looking in the sack feeding direction, and sack row transferer means movable transversely of the longitudinal feed direction of the sack row forming roller track, the sack row transferer means adapted to perform an active transfer movement and a passive return movement during which the transfer means is displaced upwardly;

d. a sack row magazine disposed intermediate the sack row-forming roller track and a packing plate assembly, the sack row magazine adapted to receive rows of sacks being transferred thereto from the sack row-forming roller track and to be moved into a position substantially overlying the packing plate assembly;

e. a two-part packing plate assembly having upper and lower surfaces, the lower surfaces being arcuately shaped in defining downwardly bulging portions of an increasing depth from two opposite lateral edges towards a center line of the packing plate assembly, and associated guide bars adjacent mutually opposed lateral edges of the packing plate assembly, and a sack stripping or transfer member disposed above the packing plate assembly and adapted to be lowered toward the packing plate assembly when the sack row magazine is being moved from a position substantially overlying the packing plate into a position intermediate the packing plate assembly and the sack row-forming roller track;

f. an elevator platform adapted to receive a pallet; and g. a roller track for removing loaded pallets from the apparatus.

2. An apparatus as defined in claim 1, wherein the sack row magazine includes a stationary plate.

3. An apparatus as defined in claim 1, wherein the sack row magazine includes a stationary plate and a sack transfer assembly with a sack transfer member movable between a position substantially overlying the stationary plate and a position substantially overlying the packing plate assembly, the sack transfer member adapted to be lowered into a lower active position when moving from the stationary plate towards the packing plate assembly, and to be raised into an upper inactive position when moving from the packing plate assembly into a position substantially overlying the stationary plate of the sack row magazine.

* * * * *